Nov. 16, 1954 T. J. RHODES 2,694,224
PLASTIC MIXING MACHINE
Filed May 10, 1951 3 Sheets-Sheet 1
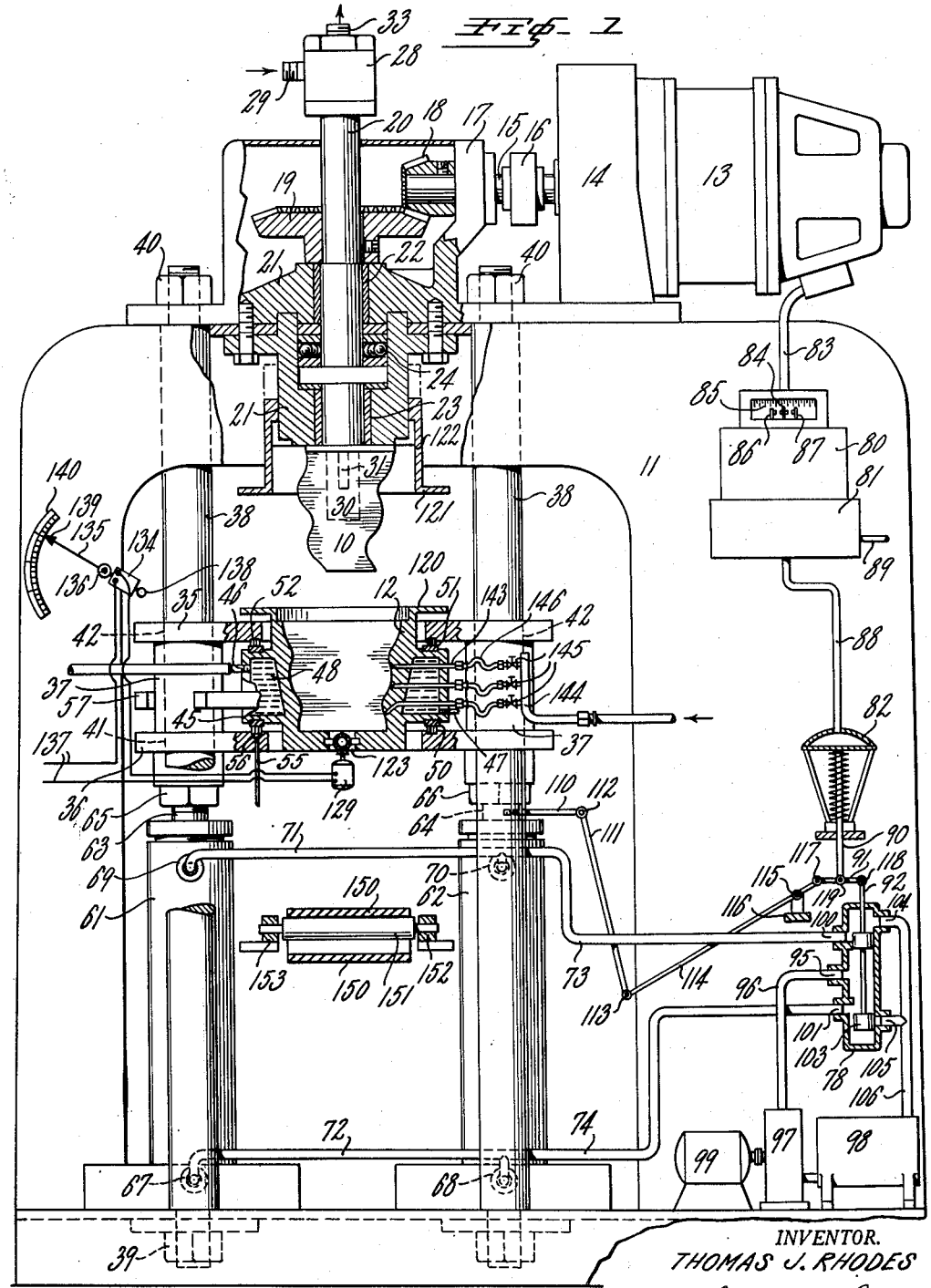
INVENTOR.
THOMAS J. RHODES
BY James J. Long
AGENT

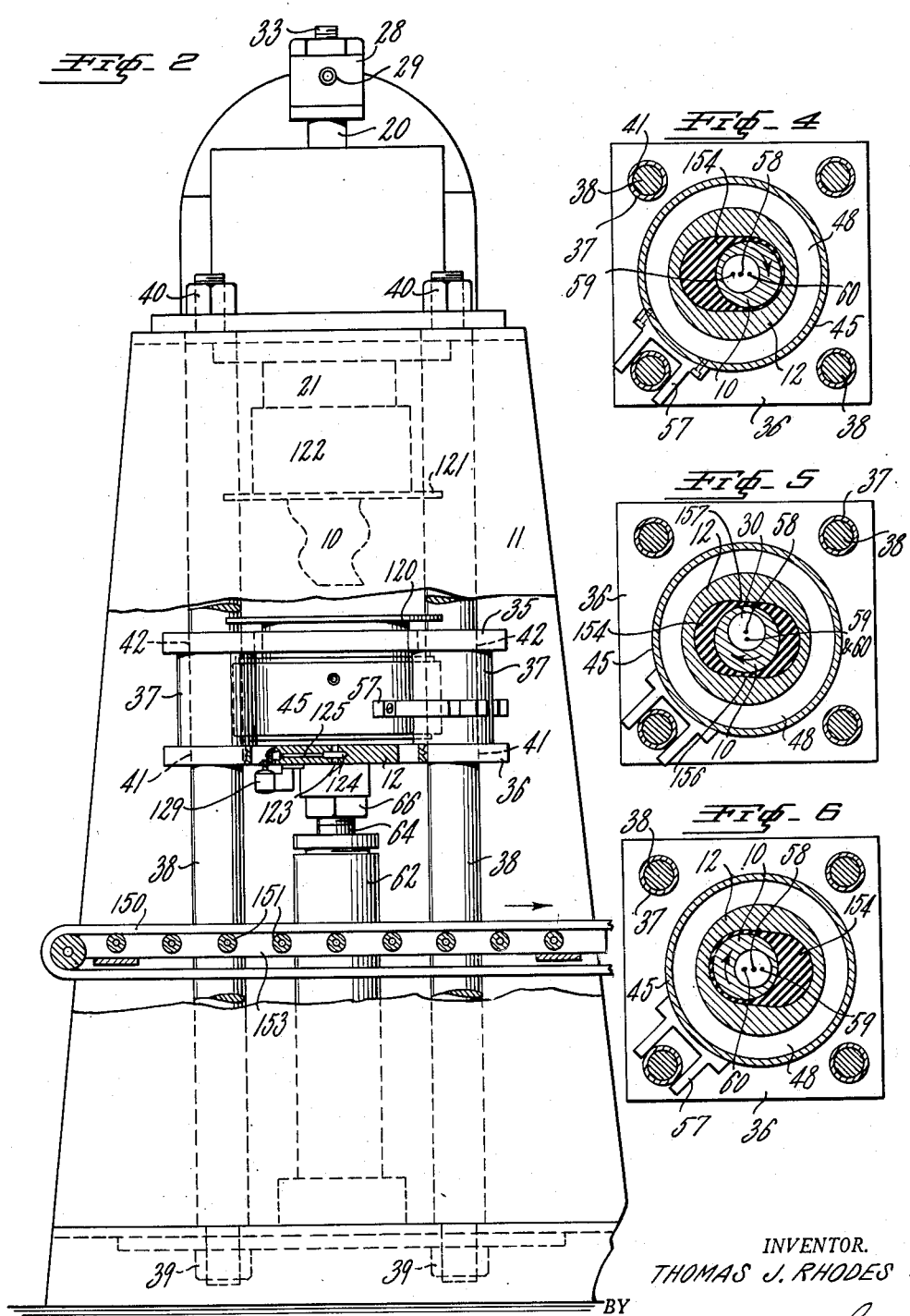

Nov. 16, 1954 T. J. RHODES 2,694,224
PLASTIC MIXING MACHINE
Filed May 10, 1951 3 Sheets-Sheet 3
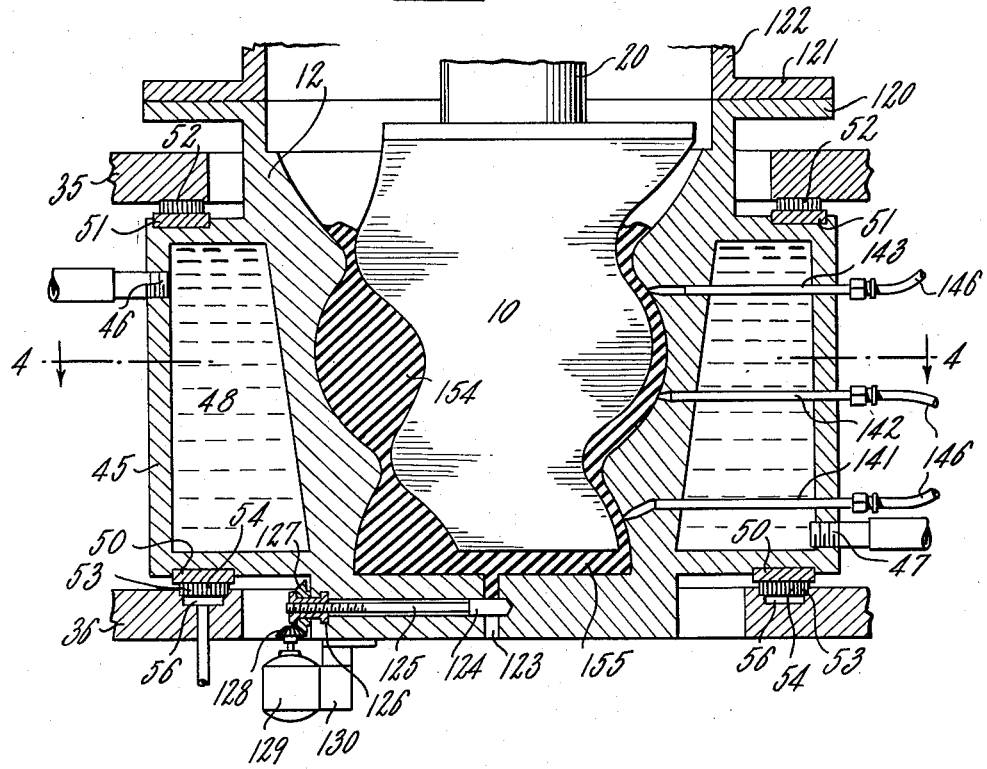
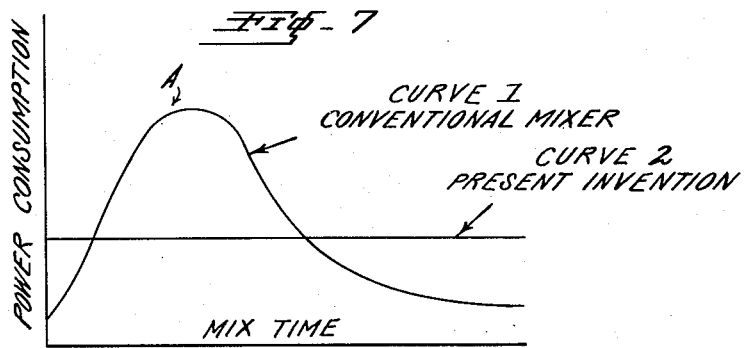
INVENTOR.
THOMAS J. RHODES
BY James J. Long
AGENT United States Patent Office 2,694,224
Patented Nov. 16, 1954

2,694,224

PLASTIC MIXING MACHINE

Thomas J. Rhodes, Clifton, N. J., assignor to United States Rubber Company, New York, N. Y., a corporation of New Jersey Application May 10, 1951, Serial No. 225,485

5 Claims. (Cl. 18—2)

This invention relates to an improved machine for mixing or working rubber and similar materials. More particularly this invention relates to a novel rubber masticating machine in which the rubber may be subjected to intense shearing and displacing forces by the action of a pair of gear members known as Moineau gears, consisting of a threaded inner member, or screw, rotating within a correspondingly threaded outer member, or barrel.

One object of the invention is to provide a rubber mixing machine in which the degree of mixing or working of the rubber may be varied by adjusting the clearance between the mixing members.

Another object of the invention is the provision of a mixing apparatus capable of operating at the level of most efficient power consumption throughout the mixing operation independently of the viscosity of the rubber mix.

A further object of the invention is the provision of rubber mixing apparatus capable of mixing successive batches of rubber to a uniform consistency.

Still another object of the invention is to provide rubber mixing apparatus in which modifying substances may be introduced into the rubber batch at a place at which the rubber is being intensely sheared, so that the said modifying substances are most effectively incorporated in the rubber.

Still another object of the invention is to provide a machine for continuously mixing rubber.

Further objects and advantages will be made evident in the following detailed description of the invention, when read with reference to the accompanying drawings, wherein, Fig. 1 is a front elevation, with parts broken away and parts of a Moineau screw mixer constructed according to this invention, with associated control mechanisms indicated partly diagrammatically, the barrel of the mixer being moved out of engagement with the mixing screw, preparatory to charging the mixer with rubber;

Fig. 2 is a similar side elevation of the mixer of Fig. 1;

Fig. 3 is a sectional elevation of part of the mixer of Fig. 1 on a larger scale, showing the barrel and screw in engagement, the barrel having a charge of rubber therein;

Fig. 4 is a cross sectional view of part of the mixer taken along the line 4—4 of Fig. 3;

Fig. 5 is a view similar to Fig. 4 showing the relative positions of the mixing screw and barrel after the screw has rotated 90° from the position shown in Fig. 4;

Fig. 6 is a similar view after the screw has rotated 180° from the position shown in Fig. 4;

Fig. 7 is a graphical representation of a typical power consumption curve for a rubber mixer constructed according to the present invention, compared to a power consumption curve for a conventional mixer; and Fig. 8 is an elevational view, with parts broken away and parts in section of a modification of the invention, adapted to continuous mixing of rubber compounds.

Broadly speaking, the invention comprises a rubber working machine embodying as the masticating elements cooperating gears of the character described in detail in U. S. Patent 1,892,217 to René Moineau, and hereinafter referred to as Moineau gears. The Moineau gear mechanism, as set forth in the previously mentioned patent, consists essentially of two helically threaded members, disposed within one another, the outer member having one more helical thread or tooth than the inner member; and every thread or tooth of the inner member having such an outline as to be constantly in contact with the outer member in any transverse section when the members are fully meshed. A further characteristic of the Moineau gear mechanism is that the ratio of the pitches of the helices of the two members is equal to the ratio of the numbers of threads of said members.

In my invention, rubber is masticated by being subjected to displacing force and intense shearing action between two relatively moving members, constituting an inner member, or screw, rotating within an outer member, or barrel, both members being threaded in the manner previously described. One end of the barrel is normally closed off, and the direction of rotation of the screw is such as to tend to force the rubber contained between the two members against this closed end of the barrel. According to a preferred embodiment of the invention, means are provided for varying or controlling the degree of working to which the rubber is subjected by varying the clearance between the screw and the barrel. This adjusting means may also be associated with a power measuring means, whereby the power consumption during the mixing operation may be controlled. Also, a controllable outlet is provided at the normally closed end of the barrel, and the rubber, after having been sufficiently mixed, may be extruded in any desired shape through this outlet by the displacing action of the rotating screw member. In the preferred form of the invention, the operation of this outlet is controlled by the viscosity of the batch being mixed, so that the batch is automatically dumped, i. e., extruded through the outlet, when the rubber has been sufficiently mixed.

For simplicity the present rubber mixing machine will be described with respect to a Moineau gear mechanism in which the inner member is a single helical thread screw circular in any transverse cross section, although any of the modified Moineau gear systems of the character disclosed in the patent referred to above may be used. Such a thread, as explained in detail in the Moineau patent referred to, is generated by moving the center of a generating circle along a helical path disposed a constant distance from a longitudinal generating axis, hereinafter referred to as the axis of the screw. The distance between the center of the generating circle and the axis of the screw is known as the eccentricity of the screw. The outer member, or barrel, in which this screw fits, has a double helical thread of the same character as that of the screw, and the axis of this barrel is parallel to the axis of the screw. One end of the barrel is open, and the screw extends longitudinally into the barrel through this opening, which is also used for charging the mixer with rubber. The other end of the barrel is normally closed. As the screw rotates within the barrel, the charge of rubber is positively displaced against the closed end of the barrel with great force. The clearance space between the end of the screw and the closed end of the barrel may be varied, and the displacing action of the screw causes the rubber to pass continually through this restricted space. This action will be more clear from the detailed description of the invention given below. While the rubber is being passed through this space, it is subjected to intense shearing action between the end surface of the screw and the end surface of the barrel, by reason of the fact that these surfaces are rotating with respect to each other. The degree of working to which the rubber is subjected may be readily controlled by varying this clearance space, by axially moving the screw and the end of the barrel with respect to each other.

In order to make possible greater control of the clearance between the surfaces which subject the rubber in the mixer to the desired shearing action, I prefer to make the screw tapered or conical, i. e. to decrease the diameter of the generating circle as it advances from the top to the bottom of the screw, and to correspondingly taper the threads of the barrel. The method of generating tapered gear members of this character is also described fully in the Moineau patent referred to above. The degree of working to which the rubber is subjected in such a tapered Moineau screw mixer can readily be varied through a wide range by moving the screw axially with respect to the barrel, thereby varying the distance between the surface of the screw and the sides of the barrel. As the screw is moved into the barrel, the rubber is sheared progressively more intensely in the changing nip between the surface of the screw and the sides of the barrel, as will be described in more detail below.

When employing the non-tapered Moineau screw and barrel, as previously described, the desired control of the clearance between the end of the screw and the closed end of the barrel may be effected by moving either the screw or the barrel axially. Alternatively, the barrel may be so constructed that the end wall of the barrel is itself movable axially with respect to the remainder of the barrel, and control of the clearance space may be effected by moving this end wall without changing the relation between the screw and the barrel. If desired, the end surface of the screw and the end wall of the barrel may be given various curved shapes, so that the rubber traverses a curved path in passing between the end of the screw and the end wall of the barrel, and is thereby subjected to more intense working.

The desired relative rotation between the screw and the barrel may be provided for in various ways. In the preferred form of the invention, the screw is rotated on its axis and the barrel is simply permitted to drift or float on a platform-like structure equipped with suitable thrust bearings, while at the same time the barrel is restrained from rotating by suitable means, such as a yoke slidably engaging a fixed standard. Under these conditions the axis of the barrel will describe a circular path. This construction is preferred because it facilitates running cooling water through both the screw and the barrel walls to remove the heat generated by the intense mixing, and because it is well adapted to controlling the degree of mixing by moving the barrel up and down on its axis.

In another form of the invention, the barrel may be stationary and the screw may be rotated on its axis by a universal drive or through a suitable spline drive, which permits the axis of the screw to move back and forth as the screw rotates on its axis.

In still another form of the invention, the screw may be rotated on a fixed axis corresponding to the axis of the screw, and the barrel may also be mounted to rotate on a fixed axis located away from the axis of the screw by a distance equal to the eccentricity of the screw as defined previously. Under these conditions rotation of the screw will cause the barrel to rotate at one-half the speed of the screw. If desired, both the screw and the barrel may be driven by suitable means, provided that the screw is driven at two times the speed of the barrel.

In some cases, it may be desirable to introduce air or other gaseous or liquid material into the rubber while it is being worked for the purpose of accelerating the softening of the rubber, or for other purposes that will be evident to the skilled rubber compounder. For this purpose, I may provide one or more suitable inlets in the side of the barrel through which material may be introduced while the rubber is being mixed. When not in use, the inlets may be sealed off by suitable means, such as by small plugs threaded into the inlets from inside the barrel.

I have found it particularly desirable to be able to introduce carbon black or other compounding ingredients into the rubber at a controlled rate during the course of the mixing period. For this purpose the mixer may be provided with a suitable inlet, preferably in the side of the barrel. Material may be fed through this inlet by a piston or ram mechanism, fed from a suitable hopper.

As mentioned previously the mixed rubber batch is discharged from the mixer by opening an outlet in the end wall of the mixer barrel. The rotation of the screw forces the rubber through this outlet. By appropriate design of this outlet, rubber may be discharged in the form of continuous strips, tubes, or other desired preformed shapes which can be subjected directly to further processing, without any necessity for sheeting the rubber on roll mills, as is usually necessary with conventional rubber mixers such as Banbury mixers. The mixer is automatically self cleaning, that is, the entire batch is removed from the mixer when the outlet is opened, due to the positive displacing action of the screw and due to the fact that there are no blind pockets or dead spots in the mixing chamber.

Turning now to the structural details of the embodiment of the invention shown in the accompanying drawing, and referring to Figs. 1 and 2, the rubber mixer shown comprises a tapered single male thread Moineau screw 10 rotatably mounted in a vertical position on a stand or frame work 11, and a mixing barrel 12 having an internal correspondingly tapered double female thread, the barrel being adapted to be moved up and down axially within the stand 11 by a hydraulic elevating mechanism to be described.

The mixing screw 10 is driven by a suitable motor 13 and transmission 14 mounted on top of the frame work 11. A horizontal shaft 15 connected to the transmission 14 by a suitable coupling 16 rotates in a bearing assembly 17, also mounted on top of the frame work 11. This shaft has a beveled pinion gear 18 at its end. The beveled pinion gear 18 engages and drives a beveled bull gear 19 on a vertical shaft 20 which passes down through the top of the frame work 11 and which carries the mixing screw 10 at its lower end. The screw shaft 20 rotates in a suitable bearing asesmbly 21 bolted to the top of the stand 11. This bearing assembly carries a number of suitable bearings 22, 23 and 24 for the screw shaft 20, the bearing 24 being a thrust bearing.

The screw shaft 20 and the mixing screw 10 are hollowed out internally and means are provided to permit the passage of cooling water through the shaft 20 and the screw 10 to carry away the heat generated by the mixing. For this purpose, the shaft 20 carries a stationary sleeve 28 having a cooling water inlet 29 in its side. Water introduced through this inlet passes down the hollowed shaft 20 into a central cavity 30 in the mixing screw 10. A central pipe 31 passes down from the stationary sleeve 28 at the top of the shaft into the cavity 30 and serves as the outgoing passage for the water, which leaves the shaft at the outlet 33 in the top of the stationary sleeve 28.

The mixing barrel 12 as shown in Figs. 1 and 2 has been lowered away from the mixing screw 10 preparatory to charging the barrel with rubber to be mixed. In order to provide for the desired relative rotation of the screw 10, and the barrel 12, the barrel 12 is mounted to float or ride between horizontal upper and lower platforms 35 and 36 on which the barrel is movably supported by bearings which will be described in detail below.

In order to permit axial adjustment of the mixing barrel 12 with respect to the mixing screw 10 these two horizontal platform members 35 and 36 are connected together by four vertical cylindrical sleeve members 37 which slidably engage four vertical tie rods 38 so that the two platforms can slide up and down as a unit on the rods 38. The tie rods 38 which serve as guide members for the platforms 35 and 36, pass from the bottom to the top of the stand 11 and are secured thereto by nuts 39 and 40 carried on the threaded end of the rod. The tie rods pass through the holes 41 in the lower platform 36 through the sleeve 37 and through holes 42 in the upper platform 37. Thus, the sleeves 37 and the platforms 35 and 36 form a cage-like assembly adapted to move up and down on the tie rods 38 which serve as guides for the entire mixing barrel assembly.

The mixing barrel 12 is surrounded by a cooling water jacket 45 having a suitable inlet 46 and outlet 47 for circulating the cooling water through an annular cavity 48 between the barrel 12 and the jacket 45.

In order to movably support the mixing barrel assembly on the platforms 35 and 36, the bottom of the jacket 45 carries a flat annular bearing 50, and the top of the jacket carries a similar flat annular bearing 51. These bearings are shown on a larger scale in Fig. 3. The upper platform 35 carries on its underside a flat annular bearing 52 which engages the bearing 51 on the top of the mixing barrel. The upper surface of the lower platform 36 also has an annular bearing member 53 which engages the bearing 50 on the bottom of the jacket of the mixing barrel. This bearing is subjected to a severe thrust created by the mixing action to be described below, and is therefore preferably a continuously pressure lubricated type of bearing. A suitable bearing is one having numerous small holes 54 passing through the lower bearing member 53, for the purpose of delivering lubricant to the working surface of the bearing. Lubricant may be supplied under pressure by any suitable pumping means (not shown) through an inlet 55 in the lower platform 36 and an annular passage 56 disposed immediately below the bearing 53. With this construction the mixing barrel is supported, in effect, on a thin film of lubricant between the bearings 50 and 53, and is free to move due to the rotation of the mixing screw 11 when the screw and barrel are in working engagement.

In order to produce mixing action on the rubber, the mixing barrel, in this form of the invention, must be restrained from rotating on its axis. This may be done by means of a suitable horizontal yoke 57 rigidly attached to the side of the jacket of the barrel and slidably engaging a fixed member, such as one of the vertical sleeves 37 on one of the tie rods 38, so that the barrel cannot revolve on its axis. A plan view of the yoke 57 is shown in Fig. 4. Under the influence of the rotation of the mixing screw, the barrel, when so mounted, will slide within upper bearings 51 and 52 and lower bearings 50 and 53 and in so doing will describe generally a circular path about the axis of the screw. The path described by the axis of the barrel during mixing is shown in Figs. 4, 5 and 6 wherein the axis of the screw 10 is indicated by point 58, and the axis of the barrel 12 is indicated by point 59. The point 60 represents the center of the circular section of the screw 10. Starting at Fig. 4, the mixing screw 10 is represented as rotating in a clockwise direction about the fixed point 58. In Fig. 5 the center of the circular screw section, point 60, has moved 90° in a circular path about the fixed point 58. This has caused a counter-clockwise rotation of the axis of the barrel, point 59, which now coincides with the center of the circular screw section point 60. In Fig. 6 the screw 10 has rotated another 90° to a position 180° away from that shown in Fig. 4. The center of the screw section, point 60, has continued to move in a circular path about the fixed screw axis 58. The axis 59 of the barrel 12 has moved 180° in a counter-clockwise direction so that the mixing screw 10 now occupies the opposite end of the mixing barrel 12, as compared to Fig. 4. From this it will be seen that the mixing barrel describes a kind of gyrating motion.

As mentioned previously, the degree of mixing of the rubber is varied by raising or lowering the mixing barrel 12 with respect to the screw 10. The mixing barrel assembly is raised or lowered by vertical hydraulic cylinders 61 and 62 suitably mounted on the bottom of the stand 11. Pistons 63 and 64 extending from the hydraulic cylinders are attached by suitable connecting members 65 and 66 to the lower platform 36. In order to raise or lower the pistons hydraulic fluid is introduced to or removed from cylinders 61 and 62 at lower ports 67 and 68 at the bottom of the cylinders, and at upper ports 69 and 70 near the top of the cylinders. A hydraulic fluid line 71 connects the upper ports 69 and 70 parallel, while another line 72 connects the lower ports 67 and 68 parallel so that the two cylinders may be operated simultaneously. To control the action of the cylinders, lines 71 and 72 are connected respectively to lines 73 and 74 and to a four-way hydraulic control valve 78, which controls the flow of hydraulic fluid into and out of the cylinders 61 and 62 and thereby controls the upward and downward movement of the mixing barrel.

In order to permit operation at the level of most efficient power consumption, the hydraulic control valve 78 is regulated by a power controlling system associated with the driving motor 13. The power-controlling system, as shown largely schematically in Fig. 1, comprises a power meter 80 of the type known as a contact-making, power-indicating controller, an electro-pneumatic controller 81, and a pneumatic diaphragm motor 82, which actuates the four-way hydraulic control valve 78. The contract-making, power-indicating controller 80, a device of known construction, is electrically connected to the driving motor 13 by an electrical cable 83 in the conventional manner, and has a pointer 84 which indicates on a scale 85 the power being consumed by the motor 13. Contact arms 86 and 87 in this meter may be set to embrace a power consumption range at which it is desired to have the motor 13 operate. The contact-making indicating controller 80 may be of the type disclosed at page 2021, Fig. 8, in "Chemical Engineer's Handbook," by Perry, published by McGraw-Hill, New York, in 1941. Movement of the pointer 84 against the contact arms 86 and 87 causes an appropriate electrical signal to be transmitted to the electro-pneumatic controller 81. This electro-pneumatic controller, a device of known construction, is adapted to translate the electrical signals from the power indicator 80 into a change in air pressure in an air line 88 which supplies the pneumatic diaphragm motor 82. The controller 81 is supplied with compressed air from a suitable source (not shown) through an inlet 89.

The action of the power controlling system is such that when the power consumption of the driving motor 13 drops to the lower limit of the desired operating range, the pointer 84 of the meter 80 makes contact with the contact arm 86, sending an electrical impulse to the electropneumatic controller 81 such that the air pressure in line 88 is increased, and the diaphragm motor 82 acts to move downwardly a connecting rod 90. A connecting link 91 transmits downward motion of the rod 90 to a valve stem 92 of the four-way hydraulic control valve 78. A supply port 95 on the four way valve 78 is connected to a hydraulic fluid inlet line 96, through which the hydraulic fluid which actuates the cylinders 61 and 62 is supplied under high pressure by a suitable pump 97 from a reservoir 98. The pump 97 is driven by a suitable motor 99. The valve 78 controls the hydraulic pressure applied to the cylinders 61 and 62 in such a way that downward movement of the valve stem 92 causes an upward movement of the mixing barrel assembly, thereby bringing the mixing screw 10 into closer engagement with the barrel 12, and hence increasing the intensity of working of the rubber in the mixer and causing the power consumed by the driving motor 13 to increase to the desired value.

For this purpose the valve 78 has two delivery ports 100 and 101, the upper delivery port 100 supplying hydraulic fluid to line 73 leading to the upper ports 69 and 70 of the hydraulic cylinders 61 and 62 and the lower delivery port 101 supplying line 74 leading to the lower ports 67 and 68 of the hydraulic cylinder. The passage of hydraulic fluid from the entrance port 95 of the valve 78 to the delivery ports 100 and 101 is controlled respectively by two valve plugs 102 and 103 on the vertical valve stem 92. Thus, the vertical position of the valve stem determines whether fluid will be supplied to the top or to the bottom of the hydraulic cylinder, and thereby controls the raising and lowering of the mixing valve assemblies. In order to provide for removal of hydraulic fluid from the cylinders 61 and 62 the control valve 78 also has two exit ports 104 and 105, also controlled by the valve plugs 102 and 103. The relative position of the plugs and ports is such that when the valve stem 92 is moved downwardly, hydraulic fluid passes into the bottom of the hydraulic cylinders through lower delivery ports 101, and the fluid in the upper part of the hydraulic cylinder passes out through exit port 104 of the valve. Similarly, upward movement of the valve stem 92 causes fluid to pass into the top of the hydraulic cylinders through the upper delivery ports 100, while the fluid in the lower parts of the hydraulic cylinders passes out through exit port 103 of the valve. The outgoing hydraulic fluid is returned to the reservoir 98 by a return line 106 connected to the exit ports 104 and 105.

As will be understood by those skilled in the art of automatic controlling systems, it is necessary, in order that the controlling valve 78 may have proper throttling action, to provide means for corrective adjusting of the valve stem 92 as the desired movement of the mixing barrel assembly occurs. For example, a downward movement of the valve stem 92 initiated by the power control mechanism for the purpose of raising the barrel 12 and increasing the power load on the motor 13 must be accompanied by a compensating upward movement of the valve stem 92 as the barrel is raised, so that the control system will have throttling characteristics. To this end, the vertical hydraulic piston 64 has rigidly attached thereto a horizontally extending rod 110 which may be threaded into the side of the piston 64. A connecting rod 111 is pivoted to the end of rod 110 at pivotal connection 112, and is also pivotally attached at a pivotal connection 113 to a lever 114. The lever 114 is attached at fulcrum 115 to a rigid bracket 116. The lever 114 is also pivotally attached at pivotal connection 117 to one end of the connecting link 91 between the diaphragm motor rod 90 and the valve stem 92. There is also a pivotal connection 118 between the rod 90 and the connecting link 91, and another pivotal connection 119 between the connecting link 91 and the valve stem 92. It will be evident that an upward movement of the hydraulic piston 64 and attached rod 110 causes, through the rod 111, the lever 114, and the connecting link 91, an upward movement of the valve stem 92. This is the required corrective adjustment of the control valve, which gives the power controlling system the desired throttling action, as opposed to simple on-off control action.

As the mixing barrel assembly is raised by the hydraulic cylinders 61 and 62 into operative engagement with the mixing screw 10, as shown in Fig. 3, a flat flange 120 on top of the mixing barrel 12 engages a corresponding flange 121 on a cylinder dust cover 122 which is slidably attached to the lower part of mixing screw bearing assembly 21. Thus the cover 122 and the flanges 120 and 121 effectively seal off the mixing chamber, preventing escape of dust.

For the purpose of discharging the mixed rubber, the bottom of the mixing barrel 12 has a rectangular discharge outlet 123 which is normally closed off by a valve plug 124.

In the preferred form of the invention, means are provided for opening the discharge outlet 123 automatically when the rubber mix reaches the desired consistency. Thus, the valve plug 124 may be withdrawn from the outlet 123 by rotation of a threaded stem 125 which is rotatably attached to the plug and which extends through a threaded collar 126. The collar carries a bevel gear 127 which is rotated by a bevel pinion gear 128 actuated by a small motor 129 suitably attached to the bottom of the mixing barrel by a bracket 130. The operation of the motor 129 which actuates the discharge outlet valve is controlled by a small switch 134 which is carried on an arm 135 pivotally attached at pivotal connection 136 to the machine frame 11. The switch 134 is electrically connected to the motor 129 by wires 137 and is automatically closed when the arm 135 is raised. The arm is arranged so that one of its ends 138 projects over the upper platform 35 of the mixing barrel assembly. When the barrel is raised to a sufficient height by the hydraulic pistons 63 and 64, the arm 135 is also raised, tripping the switch 134 and causing the motor 129 to withdraw the plug 124 from the outlet 123, thus automatically dumping the mixed charge. As will be explained in connection with the detailed description below of the mixing action of the machine, the height to which the mixing barrel is raised by the action of the automatic power controlling system is a measure of the consistency of the rubber batch in the mixer, and said height is therefore a measure of how far the mixing has progressed. The arm 135 has a pointer 139 at one end. The position of the pointer as read on a scale 140 is an indication of the consistency of the batch.

It is sometimes desirable to introduce liquid or gaseous materials to the rubber batch during the mixing. For example, air or oxygen may be introduced to accelerate the breakdown of the mixture. For this purpose, a series of inlet passages 141, 142 and 143 pass through the wall of the jacket 45 and the side wall of the barrel 12 to the mixing chamber. Air or other gaseous or liquid material may be introduced into the rubber being mixed through these inlets from a manifold 144 connected to a suitable high pressure supply means (not shown). The air inlet tubes 141, 142 and 143 are connected to the manifold 144 through reducing valves 145 and flexible metal hoses 146, which are of sufficient length to permit the gyratory motion of the mixing barrel referred to previously.

A conveyor belt 150 is disposed below the outlet 123 of the mixing barrel 12 for conveying the mixed rubber batch to the station of the next manufacturing operation. The belt 150 rides on rollers 151 suitably attached to supporting beams 152 and 153. The belt is powered by suitable means (not shown).

The operation of the mixing machine is as follows. With the mixing barrel in the lowered position as shown in Figs. 1 and 2, the mixer is charged with a mass of rubber 154 (Fig. 3) to be mixed. The motor 13 is turned on causing the mixing screw 10 to rotate in a clockwise direction. Since the barrel and screw are not in engagement, the power consumption of the motor, as indicated on the power meter 80, will be low. This will cause the electro-pneumatic controller 81 to apply air pressure through the line 88 to the diaphragm motor 82, depressing the rod 90 and depressing the valve stem 92 of the four-way hydraulic control valve 78. This causes hydraulic fluid pumped into the port 95 of the valve 78 by the pump 97 to pass through lower port 101 and line 74 into ports 67 and 68 in the bottom of hydraulic cylinders 61 and 62, thus raising pistons 63 and 64. This causes the assembly comprising platforms 35 and 36 and sleeves 37 to slide upwardly on the tie rods 38, thus bringing barrel 12 into engagement with the revolving mixing screw 10 as shown in Fig. 3. The action of the screw on the mass of rubber 154 causes the barrel 12 to slide on bearing pair 51 and 52, and bearing pair 50 and 53. The axis of the barrel describes a generally circular path about the axis of the screw in a counter-clockwise direction, as explained previously in connection with Figs. 4, 5 and 6.

The clockwise rotation of the mixing screw 10 continually exerts downward pressure on the entire body of rubber 154 in the mixing barrel 12. At the same time, there is a continual transverse displacement of the entire mass of rubber from one side of the mixing barrel to the other with each 180° rotation of the screw, since every transverse cross-section of the screw passes from one side of the barrel to the other, as shown in Figs. 4, 5 and 6. Part of the rubber mass 154 passes through a variable clearance space 155 (Fig. 3) defined by the bottom of the screw and the end wall of the barrel. The remainder of the rubber mass 154 passes through variable clearance spaces 156 and 157 between the mixing screw and the side wall of the barrel. These clearance spaces may be considered as orifices through which the rubber is forced under high pressure and in which the rubber is highly laminated. The rubber which passes under the end of the screw through the clearance space 155 is folded into or mixed with the rubber which passes around the screw through the clearance spaces 156 and 157 in a random manner which continuously changes as the screw revolves. This is a highly efficient kind of mixing action. Further, the rubber is at the same time subjected to additional intense shearing action by reason of the fact that the surfaces of the mixing screw and of the barrel are moving with respect to each other. As a result of these shearing and mixing forces the rubber can be intensely and efficiently worked. As the rubber is broken down by the mechanical working, its viscosity decreases, and this decrease results in a decrease in the amount of power being consumed by the driving motor 13. This decrease in power consumption results, through the action of the controlling system as explained previously, in a rise in the elevation of the barrel assembly, thereby decreasing the clearance spaces 155, 156 and 157 through which the rubber is being passed. This decrease in clearance space results, in turn, in an increase in the amount of work being done on the rubber, with consequent increase in the power consumption of the driving motor 13.

As the rubber becomes broken down to a lower viscosity the barrel continues to rise to reduce the clearance spaces. There will be a certain elevation of the barrel assembly as indicated on scale 140 corresponding to the desired consistency of the rubber, and the switch 134 may be set to automatically actuate the motor 129 and withdraw the outlet valve plug 124 at this elevation. The mixed product will then be extruded through the outlet 123 in the form of a ribbon onto the conveyor belt 150.

In order to show the advantages of controlling the power consumption by varying the clearance spaces between the screw and the barrel, typical power consumption curves for a conventional mixer and for the mixer of the present invention are shown in Fig. 7. Curve 1 of Fig. 7 indicates a typical power consumption curve for a conventional mixer charged with a mass of rubber and a quantity of carbon black. As the mixing proceeds the carbon black goes into the rubber, producing a very stiff mass which requires high power to mix. This phase of the mixing is indicated by the first portion of curve 1, showing how the power consumption rises to a high maximum value, indicated at A on the graph, as the carbon black becomes dispersed in the rubber. With continued working, the rubber becomes broken down and the power consumption drops off from the maximum value as shown. It will be noted that the power capacity of the driving motor on the conventional mixer must be sufficiently high to accommodate the peak power load A. However, this high power capacity is utilized for only a relatively short period of the mixing cycle, and for most of the mixing cycle the driving motor is operating at only a fraction of its potential capacity. This leaves much to be desired in economy of operation and efficiency of utilization of equipment.

In contrast to this, curve 2 of Fig. 7 shows the power consumption of a mixing machine constructed according to the present invention. The power consumption remains substantially constant throughout the mixing operation, since the power controlling system, as explained previously, acts to vary the clearance spaces 155, 156 and 157 (Figs. 3 and 4) in such a way that peak loads and low loads on the driving motor are avoided. In this way, it is possible to operate the mixing machine of this invention with a considerably smaller motor than would be required on a conventional mixer, since there is no need to accommodate a peak load even for a brief time. Or, stated in another way, a driving motor of a given size used to drive a conventional mixer in the manner represented in curve 1, could be used in the manner represented in curve 2 to drive a mixing machine of the present invention having a considerably greater batch size capacity than the conventional mixer.

A driving motor may be selected which operates at its maximum efficiency at the power level indicated by curve 2, so that the mixing is carried out with maximum economy of power consumption.

A further advantage of the mixing machine of the present invention is that all of the radial pressures exerted on the mixing screw during the mixing operation are substantially balanced. This makes it unnecessary to use extremely heavy duty outboard bearings on the mixing screw, even though the screw exerts great radial forces on the rubber, since these forces are balanced.

Another advantage of the mixer of this invention is that no special sealing means are required to seal off the bearings of the mixing screw shaft from the rubber batch, since the point where the mixing screw shaft enters the mixing screw bearings is not in contact with the rubber batch. Such sealing means, which are necessary on conventional mixers of the Banbury type, constitute a troublesome and expensive maintenance item.

The mixing machine of the present invention can be readily adapted to continuous mixing of rubber. For this purpose a longer mixing screw than the one illustrated may be employed and inlets for carbon black and other compounding ingredients may be provided at suitable points along the length of the barrel. The screw is preferably mounted to rotate on a movable axis and is driven by a shaft having a suitable universal coupling or spline drive, while the barrel is fixed.

Such a modification of the invention adapted to continuous mixing of rubber is illustrated in Fig. 8, wherein a stationary mixing barrel 180 is mounted horizontally on a suitable base 181. A motor 182 also mounted on the base 181, drives, through a gear assembly 183, a shaft 184 rotating in a bearing assembly 185 supported on a vertical standard 186 rising from the base 181. A flexible coupling assembly of the spline drive type connects the shaft 184 with another shaft 187, which carries the mixing screw 188 at its end, and which rotates in a suitable bearing assembly 189 at the entrance end of the mixing barrel 180. The flexible coupling assembly comprises a coupling member 190 rigidly attached to the driving shaft 184, and having a transverse keyway 191, and a similar coupling member 192 rigidly attached to the screw shaft 187, and also having a transverse keyway 193 disposed at right angles to the keyway 191 on coupling member 190. Disposed between the coupling members 190 and 192 is a sliding connecting plate 194, having on its opposite faces two transverse keys 195 and 196 at right angles to each other, which mesh with the keyway 191 and 193 of the coupling members 190 and 192 respectively. The member 190 is slidably secured to the key 195 by a screw 197 passing through a slot 198 in the key 195. Similarly, coupling member 192 is slidably secured to the key 196, by a screw 199 passing through a slot 200 in the key 196. This flexible coupling assembly permits the screw 188 to ride up and down as it rotates within the mixing barrel 180.

The mixing barrel 180 has a hopper 201 at its entrance end for introducing rubber 202 into the mixing chamber within the barrel. The mixing chamber may be considered to be made up of a number of mixing cavities 202 and 204 depending on the number of turns in the mixing screw 188. At suitable points along the length of the barrel there are provided inlet ports 205, 206 and 206' through which carbon black and other compounding ingredients may be introduced. Suitable introducing means, as indicated largely diagrammatically in Fig. 8, may consist of a storage hopper 207 which supplies a compounding ingredient 208 to a cylinder 209 connected with the entrance port 205. A piston 210 within this cylinder actuated by a piston rod 211 and a crank 212 may be actuated by a suitable driving means (not shown) to introduce compound 208 to the mixing cavity 203 as desired.

The mixing barrel 180 has an outlet 213 controlled by a valve plug 214 which may be withdrawn from the outlet by turning a handle 215 on a threaded valve stem 216, as shown in the drawings, permitting the mixed product 217 to issue from the mixing chamber.

Rotation of the screw 188 causes the rubber batch 202 to be urged against the outlet end of the barrel 180. However, when the outlet 213 is closed off by valve plug 214, the material in the end cavity 204 cannot move forward, and the material in cavity 203 cannot move into cavity 204 because there is no place to which to displace the material in cavity 204. Instead, the material in cavity 203 and 204 is displaced transversely, with simultaneous shearing, between the screw 188 and the wall of the mixing barrel 180 as described above in connection with Fig. 6.

On the other hand, when the outlet 213 is opened, the mixed rubber can move out of cavity 204 under the influence of the rotation of the screw 188 and an equal quantity of rubber can move from cavity 203 into cavity 204. This, in turn, is replaced by an equal quantity of fresh material from the hopper 201.

In operation, the mixing is carried out with the outlet 213 closed until the rubber in cavity 203 is mixed to the desired extent with the ingredient, for example, carbon black, introduced through entrance port 205. The valve plug 214 is then withdrawn, permitting the homogeneous carbon black containing material to pass into cavity 204, where another compounding ingredient (for example, the vulcanizing agent) is introduced through port 206. The outlet 213 is then closed and mixing is continued until the compounding ingredient is thoroughly mixed in in cavity 204. Meanwhile the new charge of material in cavity 203 is being mixed with additional carbon black introduced through port 205. In this way, as many compounding ingredients as desired, depending on the number of mixing cavities and entrance ports, can be mixed in at any stage of the mixing operation. Those ingredients which render the rubber mix sensitive to heat, e. g., accelerators, are introduced to the last mixing cavity 204, so that the rubber is subjected to a minimum of working with these ingredients present.

The material in the last cavity 204 cannot pass back into the first cavity 203 because the rotation of the mixing screw 188 continuously exerts forward pressure on the rubber. Also, as long as the outlet 213 is closed, there is, as mentioned previously, no movement of material from first cavity 203 into end cavity 204. Thus, as long as the outlet 213 is closed there is no intermingling of the materials in cavities 203 and 204 and these cavities behave as essentially independent mixing zones within which the rubber continuously undergoes the transverse rotary displacement and shearing action referred to. This unique behavior makes the mixer of the present invention particularly well adapted to continuous mixing operations, which could not be carried out in conventional rubber mixers.

The entrance port 206' for introducing compounding ingredients is located, as shown in Fig. 8 at a point of minimum clearance between the screw 188 and the barrel 206. This point coincides with the point of maximum shearing flow to which the rubber is subjected. I have found that this is a particularly advantageous point at which to introduce compounding ingredients, especially carbon black and other reinforcing agents, since highly uniform and rapid dispersion of the ingredients can be effected in this way with a minimum consumption of power.

The mixing barrel 180 and the mixing screw 188 may be cooled by suitable cooling water jackets or coils (not shown).

Having thus described my invention, what I claim and desire to protect by Letters Patent is:

1. A rubber mixing machine comprising a pair of threaded members of the Moineau type consisting of a screw member and a cooperating threaded barrel within which the screw is adapted to rotate, said barrel being closed at one end, driving means for causing relative rotation of the screw and barrel, means for changing the clearance between the screw and barrel to vary the degree of shearing action exerted on the rubber, said barrel having a discharge outlet, a barrier in said discharge outlet for retaining the rubber within the barrel while it is being mixed, means for measuring the power consumption of the driving means, control means for transmitting a signal from the power measuring means to the aforesaid clearance varying means whereby the clearance varying means operates to maintain the power consumption of the driving means at a relatively constant value as the mixing proceeds, means for removing the aforesaid barrier from the discharge outlet, and means for causing the barrier-removing means to operate when the clearance between screw and the barrel is reduced to a predetermined minimum, whereby the rubber is automatically dumped upon reaching a predetermined viscosity.

2. A rubber mixing machine comprising a pair of threaded members of the Moineau type consisting of a screw member and a cooperating threaded barrel within which the screw is adapted to rotate, said barrel being closed at one end, means for changing the clearance between the screw and barrel to vary the degree of shearing action exerted on the rubber, said barrel having a discharge outlet, a removable barrier in said discharge outlet for retaining the rubber within the barrel while it is being mixed, said screw being mounted to rotate on a fixed axis and said barrel being mounted on bearings adapted to permit the axis of the barrel to move, a yoke on the barrel slidably engaging a fixed standard to prevent the barrel from rotating while permitting the axis of the barrel to move.

3. A rubber mixing machine comprising, in combination, a supporting stand, a mixing screw having a male threaded working surface of the Moineau type geometrically characterized by having a longitudinal axis about which an imaginary generating circle is rotated on a helical path disposed a definite distance from said axis to generate said working surface, the said mixing screw being mounted on the said stand for rotation about the said axis, a cage mounted on said stand for sliding movement toward and away from said screw along a path parallel to the said axis of the screw, a mixing barrel mounted in said cage for sliding movement in a plane transverse to the axis of the screw, the said mixing barrel being provided with an internal working surface having a female thread of the Moineau type corresponding to the thread on the surface of the said mixing screw, the said mixing screw and barrel thereby defining, when in engagement with each other, a mixing chamber in which the rubber is intensely sheared when the screw is rotated on its axis, such rotation of the screw also serving to slide the mixing barrel in a generally circular gyratory path within said cage in a plane transverse to the screw, a restraining yoke mounted on said barrel and extending into sliding engagement with said stand to guide the barrel in said circular gyrating path, and a discharge outlet at the end of said barrel for delivering the mixed rubber from the mixer.

4. A rubber mixing machine comprising, in combination, a supporting stand, a mixing screw rotatably mounted on said stand and having a tapered male threaded working surface of the Moineau type geometrically characterized by having a longitudinal axis about which an imaginary generating circle is rotated on a helical path disposed a definite distance from said axis to generate said tapered working surface, a motor for rotating said screw, a mixing barrel mounted on the said stand for sliding movement toward and away from said screw along a path parallel to the said axis of the screw, said mixing barrel being provided with an internal working surface having a tapered female thread of the Moineau type corresponding to the thread on the surface of the said mixing screw, the said mixing screw and barrel thereby defining, when in engagement, a mixing chamber in which the rubber is intensely sheared and positively displaced toward one end of the barrel as the screw is rotated, an elevating device for moving said barrel axially into and out of engagement with said screw, a power measuring device connected to the said motor of the screw, a control mechanism interconnected between said power measuring device and the said elevating device of the mixing barrel, for actuating said elevating device in response to a change in power consumption in the said motor, whereby the elevating device adjusts the axial position of the mixing barrel with respect to the screw to maintain the power consumption of the screw substantially constant during a mixing operation.

5. A rubber mixing machine comprising a pair of threaded members consisting of a screw member having a male thread of the Moineau type and a cooperating barrel having a corresponding double female thread of the Moineau type within which the said screw is adapted to rotate, one axial end of said barrel being open and the other axial end of said barrel being closed, the said screw member extending axially into said barrel through said opening and terminating in close proximity to the closed end of the barrel so as to define between the end of the screw and the closed end of the barrel a narrow trans-axial rubber-shearing passage through which the rubber is forced by rotation of the screw, said closed axial end of the barrel being provided with an outlet passageway, a closure normally positioned within said passageway to prevent flow of rubber therethrough during the mixing, means for removing said closure from said passageway to permit discharge of rubber by rotation of the screw upon completion of a mixing operation.

References Cited in the file of this patent

UNITED STATES PATENTS

| Number | Name | Date |
|---|---|---|
| 1,141,898 | Merritt | June 1, 1915 |
| 1,283,947 | Steinle | Nov. 5, 1918 |
| 2,051,781 | Brown | Aug. 18, 1936 |
| 2,295,362 | Schnuck | Sept. 8, 1942 |
| 2,415,091 | Frei | Feb. 4, 1947 |
| 2,514,841 | Chase | July 11, 1950 |